(12) United States Patent
Grossman

(10) Patent No.: US 8,562,005 B2
(45) Date of Patent: Oct. 22, 2013

(54) USER PROPELLED VEHICLE HAVING A CHANNEL TO RECEIVE AN ILLUMINATABLE MEANS

(75) Inventor: Martin Grossman, Giffnock (GB)

(73) Assignee: H. Grossman Limited, Glasgow (GB)

( * ) Notice: Subject to any disclaimer, the term of this patent is extended or adjusted under 35 U.S.C. 154(b) by 0 days.

(21) Appl. No.: 13/034,960

(22) Filed: Feb. 25, 2011

(65) Prior Publication Data

US 2011/0204599 A1 Aug. 25, 2011

Related U.S. Application Data

(63) Continuation of application No. 12/703,810, filed on Feb. 11, 2010, which is a continuation of application No. 11/122,529, filed on May 5, 2005, now Pat. No. 7,712,937.

(30) Foreign Application Priority Data

May 5, 2004 (GB) .................................. 0409974.3

(51) Int. Cl.
*B62M 1/00* (2010.01)
*F21S 4/00* (2006.01)

(52) U.S. Cl.
USPC ...................... 280/87.041; 362/545

(58) Field of Classification Search
USPC ............. 280/87.041, 87.042, 87.05; 362/473, 362/543, 544, 545
See application file for complete search history.

(56) References Cited

U.S. PATENT DOCUMENTS

| | | | | |
|---|---|---|---|---|
| 4,179,133 A | * | 12/1979 | Robb | ........................ 280/87.041 |
| 4,544,993 A | | 10/1985 | Kirk | |
| 4,707,884 A | * | 11/1987 | Chang | ............................. 16/440 |
| 4,991,066 A | | 2/1991 | McCowan | |
| 4,997,196 A | | 3/1991 | Wood | |
| 5,132,883 A | | 7/1992 | La Lumandier | |
| 5,327,329 A | * | 7/1994 | Stiles | ............................. 362/545 |
| 5,513,080 A | | 4/1996 | Magle et al. | |
| 5,588,734 A | | 12/1996 | Talamo et al. | |
| 6,123,443 A | | 9/2000 | Conway | |

(Continued)

FOREIGN PATENT DOCUMENTS

| DE | 20017459 | 4/2001 |
|---|---|---|
| DE | 201 01 316 U1 | 5/2001 |

(Continued)

OTHER PUBLICATIONS http://www.razor.com, (7 pgs.)—kick scooters, dated Apr. 4, 2008.

*Primary Examiner* — Frank Vanaman
(74) *Attorney, Agent, or Firm* — Tarolli, Sundheim, Covell & Tummino LLP

(57) ABSTRACT

A scooter (110) includes a platform (116) that has an upperside and an underside. First and second walls (146, 148) depend from the underside of the platform (116) and away from the upperside of the platform (116) so as to define a space (142) between the walls (146, 148). The first wall (146) defines a void (140) that has a length that is substantially equal to the length of the space (142). At least one illuminatable means (112) is provided on the platform (116). A control box (144) for the illuminatable means (112) is provided between the first and second walls (146, 148) and within the space (142). The scooter (110) is a collapsible microscooter.

39 Claims, 6 Drawing Sheets

(56) References Cited

U.S. PATENT DOCUMENTS

| | | | |
|---|---|---|---|
| 6,186,635 B1 * | 2/2001 | Peterson et al. | 362/84 |
| 6,193,248 B1 * | 2/2001 | Liu | 280/87.041 |
| 6,199,880 B1 | 3/2001 | Favorito et al. | |
| 6,203,037 B1 * | 3/2001 | Wilson et al. | 280/87.042 |
| 6,260,866 B1 | 7/2001 | Cheng | |
| 6,270,095 B1 * | 8/2001 | Chang | 280/87.041 |
| 6,273,440 B1 * | 8/2001 | Wilson | 280/87.042 |
| 6,337,528 B1 * | 1/2002 | Jung | 310/168 |
| 6,382,366 B1 * | 5/2002 | Chang | 188/29 |
| 6,533,438 B2 * | 3/2003 | Ter-Hovhannisian | 362/276 |
| 6,619,679 B2 * | 9/2003 | Lan | 280/87.05 |
| 6,646,547 B2 | 11/2003 | Chiu | |
| 7,048,284 B1 | 5/2006 | Seifert | |
| 7,712,937 B2 | 5/2010 | Grossman | |
| 2002/0000339 A1 | 1/2002 | Tsai | |
| 2002/0030339 A1 | 3/2002 | Powers | |
| 2002/0105158 A1 | 8/2002 | Stewart et al. | |
| 2002/0135464 A1 | 9/2002 | Chiu | |
| 2002/0135998 A1 | 9/2002 | Chiu | |
| 2003/0007352 A1 | 1/2003 | Ter-Hovhannisian | |
| 2005/0029767 A1 | 2/2005 | Chang | |
| 2006/0083012 A1 | 4/2006 | Ter-Hovhannissian | |

FOREIGN PATENT DOCUMENTS

| | | |
|---|---|---|
| DE | 201 07 388 U1 | 8/2001 |
| DE | 200 18 683 U1 | 9/2001 |
| DE | 203 02 674 U1 | 7/2003 |
| DE | 203 11 094 U1 | 2/2004 |
| EP | 1 174 335 A2 | 1/2002 |
| EP | 2 025 587 A2 | 2/2009 |
| GB | 2 360 984 A | 10/2001 |
| GB | 2 381 503 A | 5/2003 |
| GB | 2 397 808 A | 8/2004 |
| GB | 2 404 435 A | 2/2005 |
| JP | 2003-265673 A | 9/2003 |
| WO | WO 98/46474 A2 | 10/1998 |

* cited by examiner

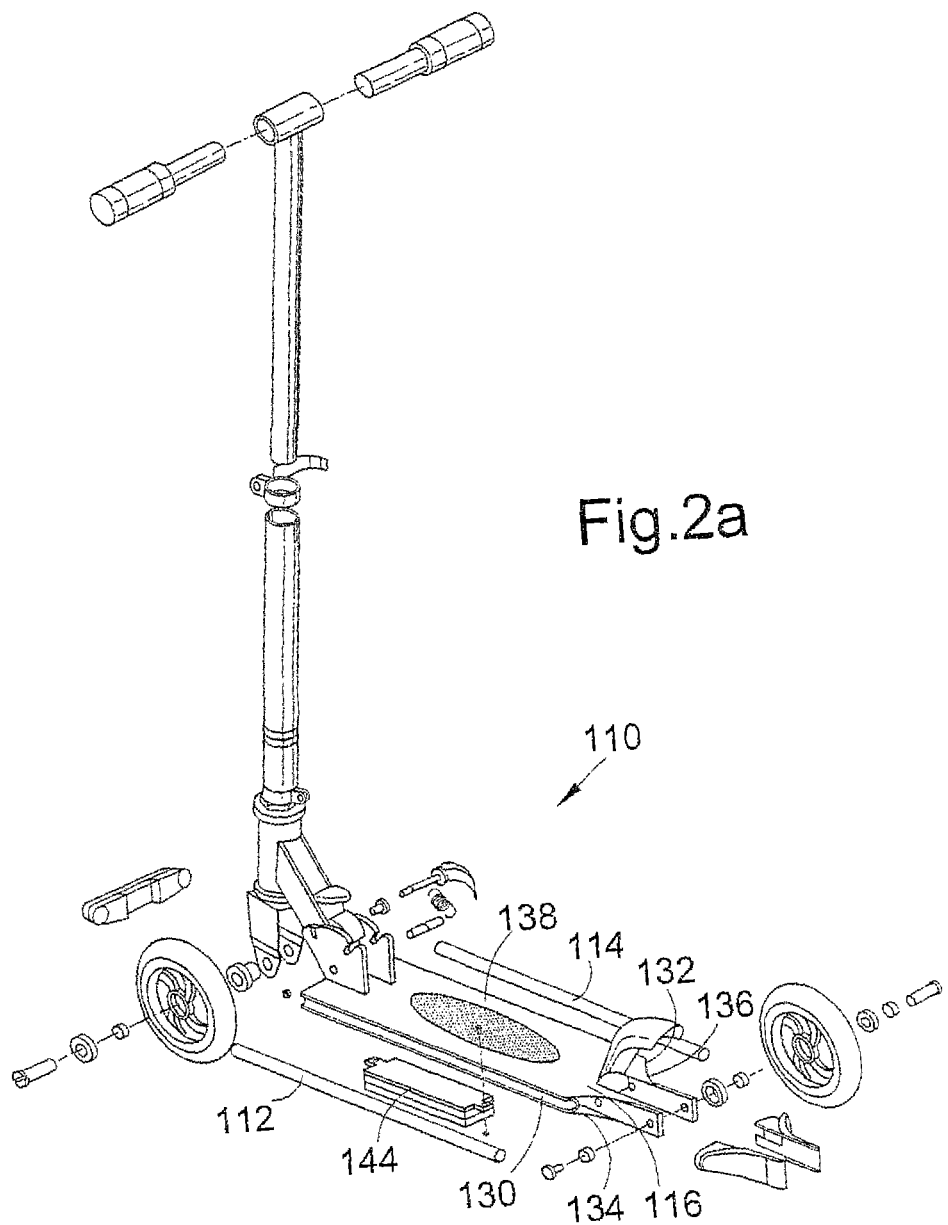

USER PROPELLED VEHICLE HAVING A CHANNEL TO RECEIVE AN ILLUMINATABLE MEANS

CROSS-REFERENCES TO RELATED APPLICATIONS

This application is a Continuation of U.S. patent application Ser. No. 12/703,810, filed Feb. 11, 2010, which is a Continuation of U.S. patent application Ser. No. 11/122,529, filed May 5, 2005, now U.S. Pat. No. 7,712,937, which claims priority from British Patent Application No. GB0409974.3, filed May 5, 2004. The present application claims priority to the aforementioned patent applications, which are incorporated in their entirety herein by reference for all purposes.

FIELD OF THE INVENTION

The present invention relates to an improved scooter or similar type self/foot-propelled transport means. The invention particularly, though not exclusively, relates to a scooter or the like incorporating a novelty illumination or lighting effect.

BACKGROUND OF THE INVENTION

Scooters have undergone an upsurge in popularity in recent years because of innovations, such as folding scooters and micro-scooters.

It is an object of at least one embodiment of at least one aspect of the present invention to provide an improved scooter incorporating a novelty lighting effect.

SUMMARY OF THE INVENTION

According to a first aspect of the present invention there is provided a scooter or other self or foot propelled vehicle or the like having at least one illuminatable means or medium.

Provision of the at least one illuminatable means or medium on a scooter or any user-propelled vehicle, will, when illuminated, make the scooter or user-propelled vehicle more visible to onlookers and passers by. Making a scooter more visible can assist in avoiding and/or reducing accidents involving scooters, and/or can provide an additional visual effect such as a novelty visual effect, e.g. when the rider is performing stunts or maneuvers.

Preferably, the scooter has a platform or deck for supporting, e.g. a foot or feet of a user.

The at least one illuminatable means may be coupled to the platform.

Preferably, the platform has at least one longitudinal edge and the at least one illuminatable means is provided on or adjacent to the platform along at least a portion of the at least one longitudinal edge.

Having at least one illuminatable means provided on or adjacent to at least one longitudinal edge of the platform permits an illuminatable means of a length suitable for seeking to maximize the visual effect created to be used.

Preferably, the platform has first and second substantially parallel longitudinal edges, and the scooter provides first and second illuminatable means on or adjacent each respective longitudinal edge.

Having the illuminatable means on or adjacent to the longitudinal or side edges of the platform permits the visual effect to be viewed or noticed by onlookers or passers-by on either side of the scooter.

Preferably, there are provided means for coupling the at least one illuminatable means to the platform.

Preferably, the or each at least one longitudinal edge has at least one channel, the or each at least one channel being adapted to receive a respective at least one illuminatable means. Alternatively, at least one channel is provided or mounted adjacent an/each at least one longitudinal edge, the/each at least one channel being adapted to receive a respective at least one illuminatable means.

Preferably, the or each channel has a generally "C" cross-section.

A channel, particularly a "C" channel, provides a secure housing for an illuminatable means, at least partially protecting the illuminatable means from damaging impacts whilst not significantly decreasing the overall illumination effect.

Preferably, the at least one illuminatable means can be releasably mounted in the channel.

Releasably mounting the illuminatable means in the channel may permit the illuminatable means to be replaced if it fails, and may permit the user to change the illuminatable means if a different visual effect is desired or required.

Preferably, the platform is an extruded metal platform.

Using extrusion to manufacture the metal platform allows the platform, including the channel or channels, to be manufactured as a unitary component, thereby potentially increasing the strength of the platform and reducing the cost of manufacture of the platform, when compared to a platform made from a number of component parts.

Preferably, the metal is substantially aluminium or an alloy thereof.

Aluminium is a strong, low cost and low weight metal, which is particularly suited for this application.

Preferably, the at least one illuminatable means comprises an illuminatable rod or tube.

The illuminatable rod or tube may be at least part transparent or translucent.

Preferably, the illuminatable rod or tube comprises a polymeric sheath enclosing or encapsulating a plurality of electrically connected illumination devices, e.g. light emitting diodes (LEDs).

The illuminatable rod or tube may be made substantially from polyinylchloride (PVC), e.g. PVC resin, plasticiser, stabilizer and toner.

The illuminatable rod or tube may comprise a hollow tube containing the illumination devices or a solid rod encapsulating the illumination devices.

LEDs are preferred as LEDs use relatively low levels of power whilst providing a desired visual effect. A polymeric sheath is preferred as protection for the LEDs due to polymer's robust shatter resistant qualities.

Preferably, the scooter includes control means for the user to select a desired operation mode of the illuminatable means. It is preferred that alternative visual effects can be selected and controlled by the user.

Preferably, the control means comprises switch means. The control means may be programmed to operate in a number of modes such as off and on and optionally continuous, flashing, strobing etc.

Preferably, the illuminatable means is powered by one or more batteries. Alternatively, the scooter includes a power generator such as a dynamo for powering the illuminatable means. A dynamo is an electro-magnetic power generator that converts rotational mechanical energy to AC power.

Most preferably, the scooter is a collapsible micro-scooter.

According to a second aspect of the present invention there is provided a platform or deck for supporting a user on a scooter or the like, the platform including a footplate and at least one channel portion adapted to receive an illuminated means.

Preferably, the platform is manufactured as a unitary component.

Preferably, the platform is an extruded metal platform.

Preferably, the metal is substantially aluminium or an alloy thereof.

Preferably, the platform has two substantially parallel channel portions.

Preferably, the at least one channel portion has a generally "C" cross-section.

Preferably, the platform is a platform for a micro-scooter or collapsible micro-scooter.

According to a third aspect of the present invention there is provided a method of manufacturing a platform for a scooter, the platform comprising a footplate, and at least one channel portion adapted to receive an illuminatable means, the method comprising the step of:

extruding the platform as a unitary component.

Preferably, the platform is extruded from metal. Preferably, the metal is substantially aluminium or an alloy thereof.

According to a further aspect of the present invention there is provided a scooter or other self or foot propelled vehicle including a platform or deck for supporting a foot or feet of a user, the platform having at least one longitudinal edge, at least one illuminatable means, and at least one channel provided on or mounted adjacent to at least a portion of the at least one longitudinal edge, the at least one channel being configured to receive and entrap or retain, optionally releasably, the at least one illuminatable means.

The at least one illuminatable means may comprise an elongate member providing a plurality of illumination devices, and the at least one channel may comprise an elongate channel.

A height or width of an inner portion of the at least one channel may be greater than a height or width of an opening of the at least one channel, and a height or width of the at least one illuminatable means may be greater than the height or width of the opening of the at least one channel. The illuminatable means may be visible through the opening, which opening may comprise a longitudinally extending opening.

The platform may have first and second substantially parallel longitudinal edges, first and second channels provided on or mounted adjacent to at least a portion of each respective longitudinal edge, and first and second illuminatable means received within and entrapped or retained by the respective first and second channels.

The or each channel may have a generally "C"-shaped cross-section.

The at least one illuminatable means may be releasably retained in the at least one channel.

The platform may be an extruded metal platform. The metal may be substantially aluminium or an alloy thereof. The at least one illuminatable means may comprise an illuminatable rod or tube.

The illuminatable rod or tube may be at least part transparent or translucent.

The illuminatable rod or tube may comprise a polymeric sheath enclosing or encapsulating a plurality of electrically connected illumination devices such as light emitting diodes (LEDs).

The illuminatable rod or tube may be made substantially from polyvinylchloride (PVC).

The illuminatable rod or tube may comprise a hollow tube containing the illumination devices or a solid rod encapsulating the illumination devices.

The scooter may include control means for the user to select a desired operation mode of the illuminatable means.

The control means may comprise switch means.

The control means may be programmed to operate in a number of modes selected from: off and on, and optionally one or more of continuous, flashing, strobing.

The illuminatable means may be powered by one or more batteries.

The scooter may include a power generator such as a dynamo for powering the illuminatable means.

The scooter or other self propelled vehicle may be a scooter, most preferably a micro-scooter or collapsible micro-scooter.

The at least one illuminatable means may be received within the at least one channel either from an end of the at least one channel or by snapping the at least one illuminatable means into the at least one channel.

According to a yet further aspect of the present invention there is provided a platform or deck for supporting a user on a scooter or the like, the platform including a footplate, and at least one channel portion configured to receive and entrap an illuminatable means.

The platform may be manufactured as a unitary component.

The platform may be an extruded metal platform.

The metal may be substantially aluminium or an alloy thereof.

The platform may have two substantially parallel channel portions, e.g. formed on opposing side edges thereof.

The channel portions may have a generally "C" cross-section.

The platform may be a platform for a micro-scooter or collapsible micro-scooter.

According to a still further aspect of the present invention there is provided a method of manufacturing a platform for a scooter, the platform including a footplate and at least one channel portion adapted to receive and entrap an illuminatable means, the method including the step of extruding the platform as a unitary component.

The platform may be extruded from metal substantially comprising aluminium or an alloy thereof.

BRIEF DESCRIPTION OF THE DRAWINGS

Embodiments of the present invention will now be described by way of example only, and with reference to the accompanying drawings, which are:

FIG. 2a is an exploded perspective view of a scooter according to a second embodiment of the present invention in an operational state;

FIG. 3 is a cut away cross-sectional view through a platform of the scooter of FIG. 2a;

DETAILED DESCRIPTION OF PREFERRED EMBODIMENTS

Figure 1:
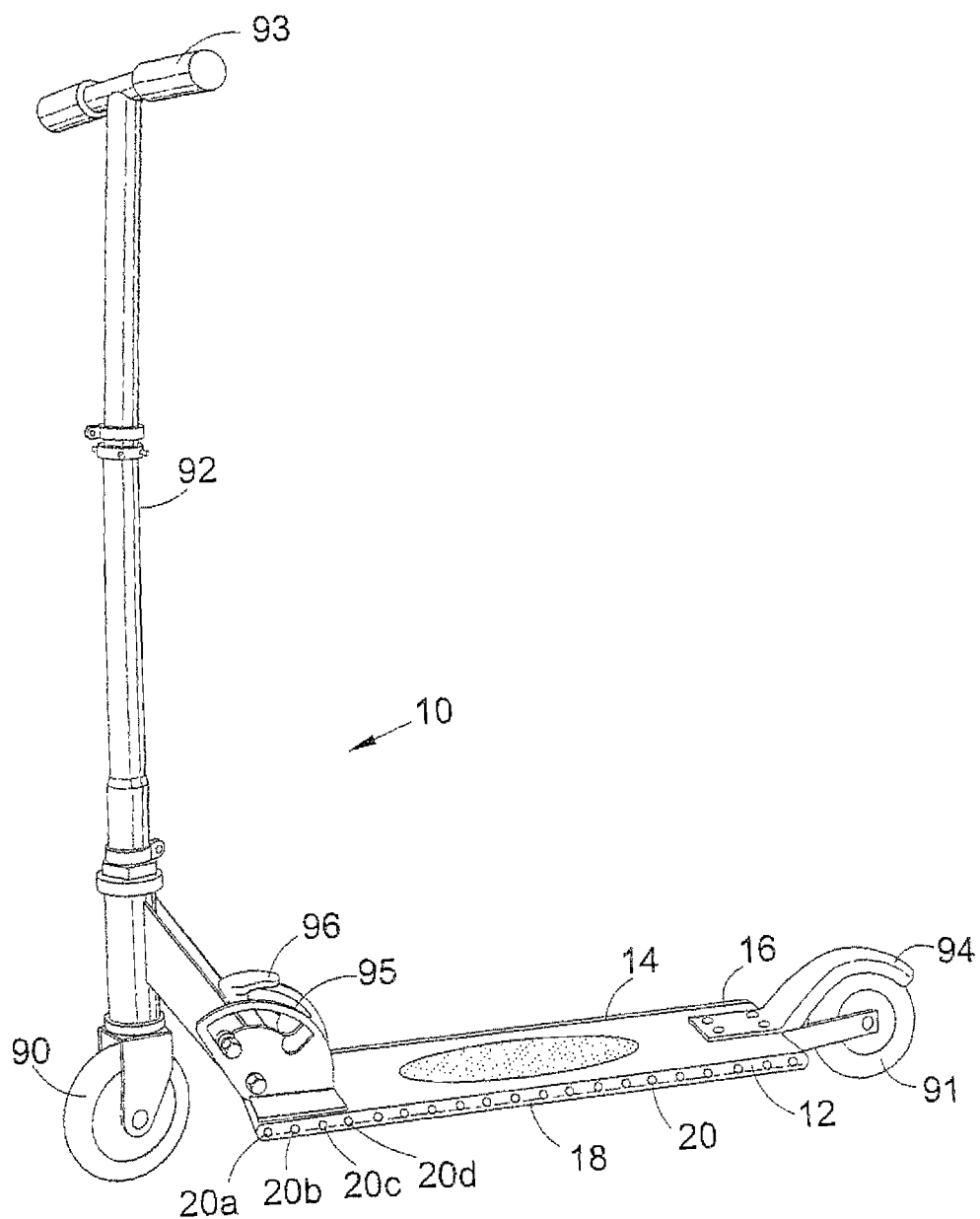
FIG. 1 is a perspective view of a scooter according to a first embodiment of the present invention in an operational state.

Referring initially to FIG. 1 there is shown a perspective view of a scooter generally designated 10 according to a first embodiment of the present invention. The scooter 10 includes a first illuminatable means or tube 12 and a second illuminatable means or tube 14. The first and second illuminatable tubes 12, 14 are coupled to a platform or deck 16. The first illuminatable tube 12 comprises a polymeric sheath 18 and a plurality of light emitting diodes (LEDs) 20. In this embodiment there are provided twenty LEDs 20. The first four 20*a*-20*d* are indicated. The second illuminatable tube 14 is similar to the first illuminatable tube 12.

The scooter 10 also includes first and second wheels 90, 91, steering column 92, handle bars 93 and brake 94 as well as hingable locking mechanism 95 including lever 96.

Referring now to FIG. 2*a* there is shown an exploded perspective view of a scooter 110 including first and second illuminatable means or tubes 112, 114 according to a second embodiment of the present invention. Parts of scooter 110 are indicated by the same number as like parts of scooter 10 but increased by '100'.

The scooter 110 includes first illuminatable tube 112 and second illuminatable tube 114. The first and second illuminatable tubes 112, 114 are coupled to a platform 116 by placing them into "C" section channels 130,132 formed along the edges 134,136 of the platform 116 which provides footplate 138, e.g. by inserting the tubes 112, 114 from an edge of the respective channel 130, 132 or by "snapping" the tubes 112, 114 into the respective channel 130,132. In this embodiment, as in the first embodiment, the platform 116 has been manufactured as a single component by extruding footplate 139 and the "C" section channels 130, 132 in one piece. Alternatively the "C" section channels 130, 132 can be mounted to the edges 134, 136 of the platform 116 which provides footplate 138 using screws, rivets or any other suitable fixing means.

Also shown in FIG. 2*a* is control box 144 which contains a control system (not shown) and batteries (not shown) for the illuminated tubes 112, 144. The control box 144 is mounted on an underside of the footplate 138.

Figure 2B:
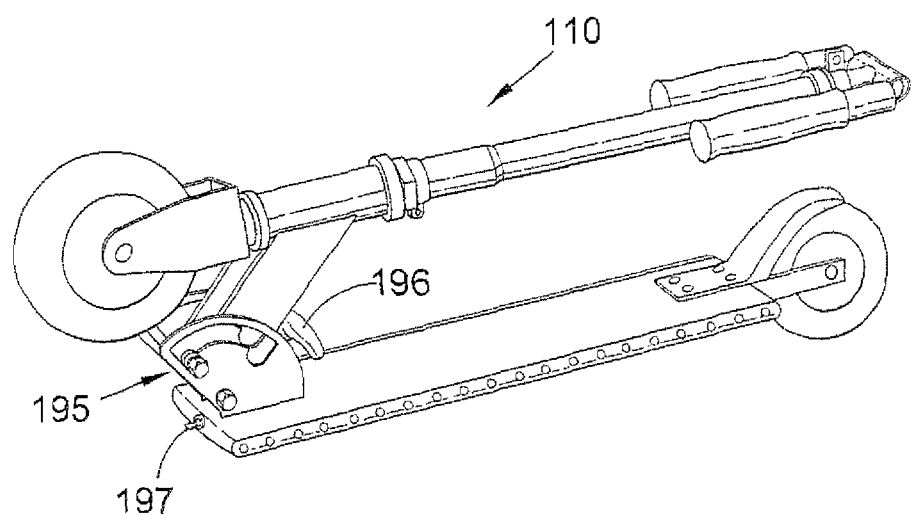
FIG. 2b is a perspective view of the scooter of FIG. 2a in a collapsed state.

Referring to FIG. 2*b* it can be seen that the scooter 110 is erectably collapsible via a hingable locking mechanism, generally designated 195, and including a lever 196 as is generally known in the art.

The scooter 110 also provides a switch means 197 mounted at one end of the platform 116. The switch 197 controls the operation of the illuminatable means 112, 114 and selection of the lighting configuration or mode, for which see the description for the third embodiment hereafter.

Figure 3:
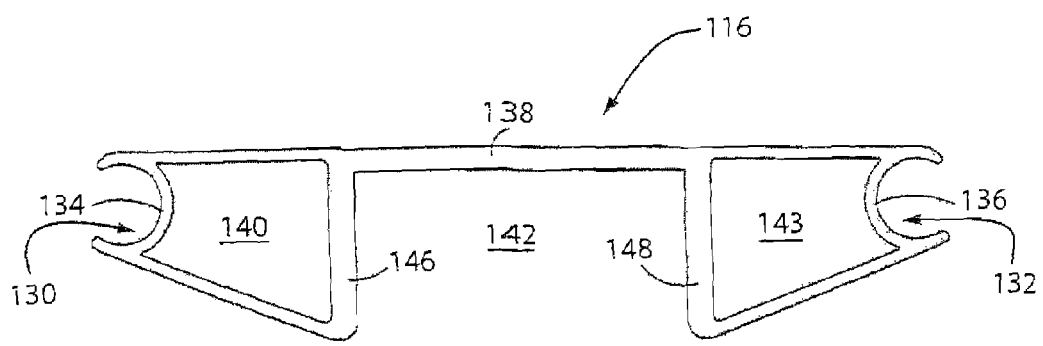

Referring now to FIG. 3 there is shown a cut away cross-sectional view through the platform of the scooter 110 of FIG. 2*a*. As can be seen the platform 116 has been extruded as a single component and comprises a footplate 138 with edges 134, 136 defining "C" channels 130, 132. The platform 116 has been designed to be a low weight component and accordingly includes two voids 140, 143 to minimise material usage and therefore weight.

The control box 144 (shown in FIG. 2*a*) fits into the space 142 between the voids 140, 143. Once in position the control box 144 is protected by walls 146,148 of void 142.

Figure 4:
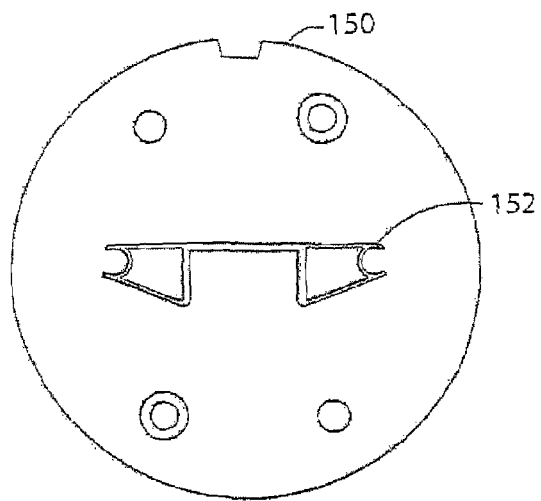
FIG. 4 is a plan view of a tool used for extrusion of the platform of FIG. 3.

FIG. 4 shows a plan view of a tool used for the extrusion of the platform of FIG. 3. The tool 150 includes aperture 152 through which aluminium is extruded to form platform 116.

Figure 5:
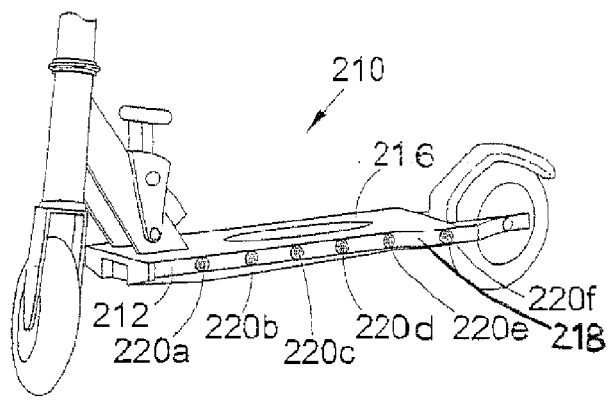
FIG. 5 is a perspective view of part of a scooter according to a third embodiment of the present invention in a first lighting configuration.

Referring now to FIG. 5 there is shown a perspective view of part of a scooter 210 according to a third embodiment of the present invention. Parts of the scooter 210 are indicated by the same number as like parts of scooter 10 but increased by '200'.

The scooter 210 includes a first illuminatable tube 212 and a second illuminatable tube (not shown). The first (and second) illuminatable tube 212 is coupled to a platform 216, and includes an at least part transparent or translucent polymeric sheath 218, and a plurality of light emitting diodes (LEDs) 220*a*-220*f*. In this embodiment six LEDs 2201-220*f* are provided. In FIG. 5 the LEDs 220*a*-220*f* are shown in a first lighting configuration, in which none of the diodes 220*a*-220*f* are illuminated.

Figure 6:
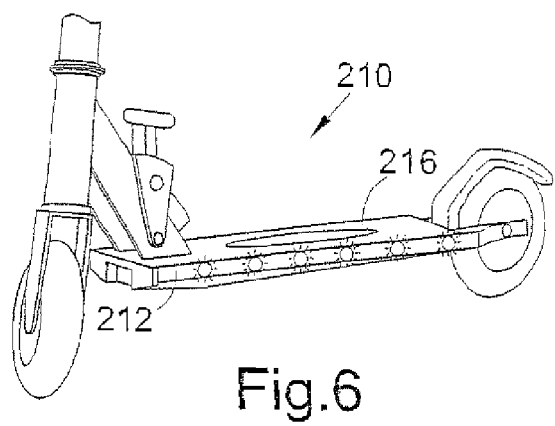
FIG. 6 is a perspective view of part of the scooter of FIG. 5 in a second lighting configuration.

FIG. 6 shows the scooter 210 of FIG. 5 in a second lighting configuration, in which all the diodes 220*a*-220*f* are illuminated (for clarity the reference numerals 220*a*-220*f* are included only on FIG. 5). If the user desires the control box (not shown) is programmed to alternate between these two, first and second, configurations to provide a flashing effect.

Figure 7A:
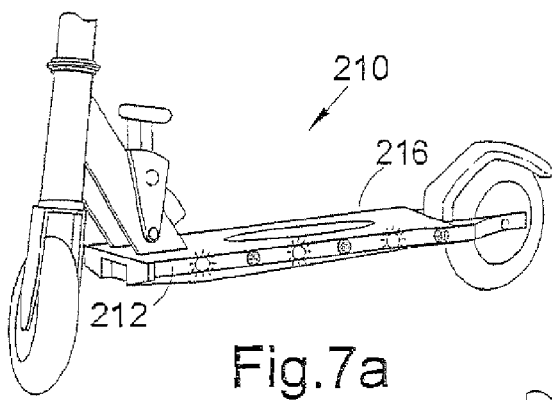
FIGS. 7a-b are perspective views of part of the scooter of FIG. 5 in a third lighting configuration.
Figure 7B:
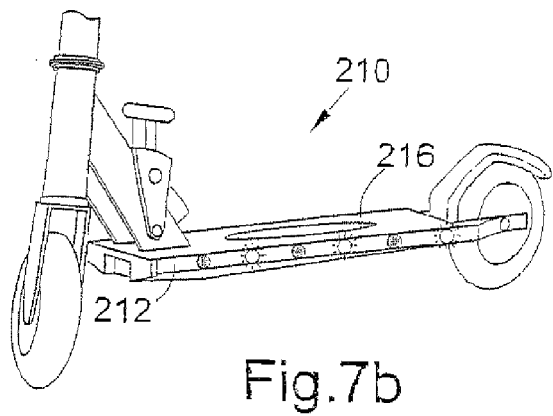

FIGS. 7*a* and 7*b* show the scooter 210 of FIG. 5 in a third lighting configuration. In FIG. 7*a* the first, third and fifth diodes 220*a*, 220*c* and 220*e* are illuminated and the second, fourth and sixth diodes 220*b*, 220*d* and 220*f* are not. In FIG. 7*b* the reverse state is shown, i.e. the second, fourth and sixth diodes 220*b*, 220*d* and 220*f* are illuminated and the first, third and fifth diodes 220*a*, 220*c* and 220*e* are not. Alternation between these two states will result in a pattern in which three single illuminated spots or dots appear to be moving from one end of the illuminated tube 212 to the other.

FIGS. 8*a* to 8*d* show the scooter 210 of FIG. 5 in a fourth lighting configuration.

Figure 8A:
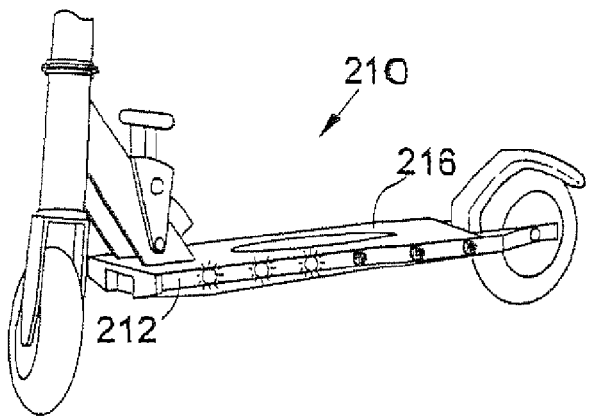
FIGS. 8*a-d* are perspective views of part of the scooter of FIG. 5 in a fourth lighting configuration.

In FIG. 8*a*, the first, second and third diodes 220*a*, 220*b* and 220*c* are illuminated and the fourth, fifth and sixth diodes 220*d*, 220*e* and 220*f* are not.

Figure 8B:
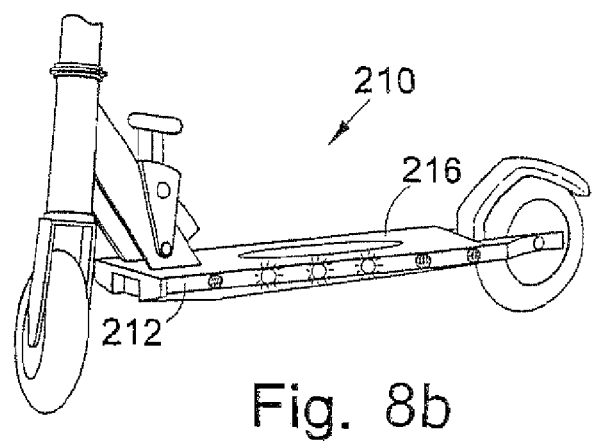

In FIG. 8*b*, the second, third and fourth diodes 220*b*, 220*c* and 220*d* are illuminated and the first, fifth, and sixth diodes 220*a*, 220*e* and 220*f* are not.

Figure 8C:
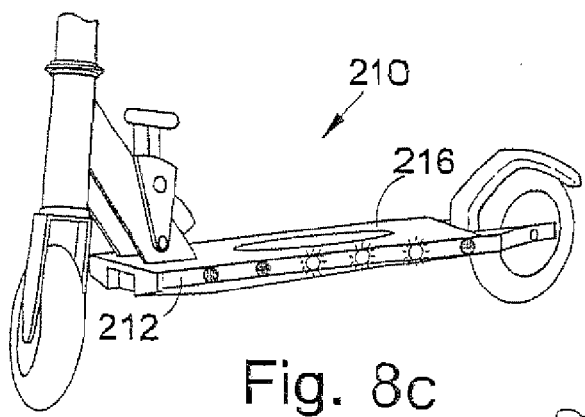

In FIG. 8*c*, the third, fourth and fifth diodes 220*c*, 220*d* and 220*e* are illuminated and the first, second and sixth diodes 220*a*, 220*b* and 220*f* are not.

Figure 8D:
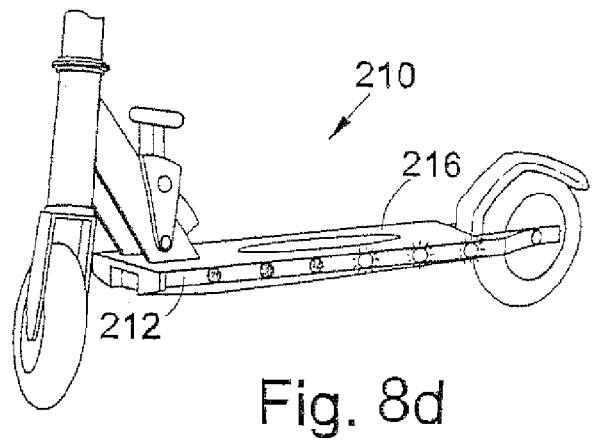

In FIG. 8*d*, the fourth, fifth and sixth diodes 220*d*, 220*e* and 220*f* are illuminated and the first, second and third diodes 220*a*, 220*b* and 220*c* are not.

Repeatedly sequencing through the four stages of the fourth configuration would give a viewer the impression that three lights are moving together from one end of the illuminated tube 212 to the other.

It will be understood that the foregoing embodiments of the present invention are given for illustrative purposes only, and that various modifications and improvements may be made to the scooters described herein without departing from the scope of the invention.

For example although the lighting configurations discussed in FIGS. 5 to 8*d* use a six LED lighting tube, any number of LEDs could be used to create different lighting effects such as lights converging on the middle from each end, or diverging from the middle to each end.

Similarly the lights can be any colour, or could be a combination of different colours.

It will be appreciated that the exemplified embodiments of the scooters hereinbefore described are collapsible "micro-scooters". However, it will be appreciated that the novel lighting effect provided by the illuminatable means may be provided on other types of scooters, skateboards or other foot-propelled vehicles having a platform or deck and two or more wheels.

It will also be appreciated that the disclosed embodiments all include the feature of claim 1, but may be modified to include one or more of the features given in the "Summary of Invention" in any combination.

The invention claimed is:

1. A foot-propelled scooter comprising:
    at least one front wheel, at least one rear wheel, a steering column and handlebars;
    a platform having an upperside and an underside and being a metal platform manufactured as a unitary component;
    at least one illuminatable means provided on the platform, wherein the platform has first and second longitudinal edges, and first and second channels associated with at least a portion of each respective longitudinal edge, the first and second channels being configured to receive the at least one illuminatable means;
    first and second walls depending from the underside of the platform away from the upperside of the platform so as to define a space between the walls, the first wall defining a void and the second wall defining a further void, each void having a length that is substantially equal to the length of the space, wherein the first wall comprises a first portion that extends from the underside of the platform and a second portion that extends at an angle between the first portion and the first channel and is spaced from the underside of the platform, wherein the second wall comprises a first portion that extends from the underside of the platform and a second portion that extends at an angle between the first portion of the second wall and the second channel and is spaced from the underside of the platform; and
    a control box for the illuminatable means, the control box being provided between the first and second walls and within the space.

2. A scooter as claimed in claim 1 comprising: the platform for supporting at least one foot of a user, each of the first and second channels being configured to receive the at least one illuminatable means in an entrapping relationship, at least one of a height or width of an inner portion of each first and second channel being greater than a corresponding at least one of a height or width of an opening of each first and second channel, and at least one of a height or width of the at least one illuminatable means being greater than the corresponding at least one of a height or width of the opening of each first and second channel, wherein the at least one illuminatable means comprise a rod or tube and a plurality of illumination devices, wherein the plurality of illumination devices are provided within the rod or tube.

3. A scooter as claimed in claim 1, wherein the platform has first and second substantially parallel longitudinal edges, and first and second illuminatable means received within and retained by the respective first and second channels.

4. A scooter as claimed in claim 1, wherein each first and second channel has a generally "C"-shaped cross-section.

5. A scooter as claimed in claim 1, wherein the at least one illuminatable means is releasably retained in the at least one channel.

6. A scooter as claimed in claim 1, wherein the metal comprises aluminum.

7. A scooter as claimed in claim 1, wherein the at least one illuminatable means comprises at least one of an illuminatable rod and an illuminatable tube.

8. A scooter as claimed in claim 1, wherein at least a portion of the illuminatable means is at least one of transparent and translucent.

9. A scooter as claimed in claim 8, wherein the illuminatable means comprises at least one of a hollow tube enclosing the plurality of illumination devices and a solid rod encapsulating the plurality of illumination devices.

10. A scooter as claimed in claim 9, wherein the scooter includes control means which is programmed to operate the illuminatable means in at least one of an off mode, an on mode, a continuous mode, a flashing mode and a strobing mode.

11. A scooter as claimed in claim 1, wherein the illuminatable means comprises a polymeric sheath and a plurality of illumination devices provided within the polymeric sheath, the plurality of illumination devices being electrically connected.

12. A scooter as claimed in claim 1, wherein the illuminatable means is made substantially from polyvinylchloride (PVC).

13. A scooter as claimed in claim 1, wherein the scooter includes control means for the user to select a desired operation mode of the illuminatable means.

14. A scooter as claimed in claim 13, wherein the control means comprises switch means.

15. A scooter as claimed in claim 1, wherein the illuminatable means is powered by at least one battery.

16. A scooter as claimed in claim 1, further including a power generator for powering the illuminatable means.

17. A scooter as claimed in claim 1, wherein the at least one illuminatable means is received within each first and second channel by at least one of inserting from an end of each first and second channel and snapping the at least one illuminatable means into each first and second channel.

18. A scooter as claimed in claim 1, wherein the illuminatable means comprises at least one of an illuminatable rod and an illuminatable tube, at least a portion of the illuminatable means being at least one of transparent or translucent, and the illuminatable means comprising a polymer sheath containing a plurality of light emitting diodes (LEDs).

19. A scooter as claimed in claim 1, wherein the first and second walls extend substantially parallel to one another along respective first and second substantially parallel longitudinal edges of the platform.

20. A scooter as claimed in claim 1, wherein the platform has first and second substantially parallel longitudinal edges, and the scooter provides first and second illuminatable means on or adjacent each respective longitudinal edge.

21. A scooter as claimed in claim 1, wherein there are provided means for coupling the at least one illuminatable means to the platform.

22. A scooter as claimed in claim 1, wherein the at least one illuminatable means comprises an illuminatable rod or tube, wherein the illuminatable rod or tube is at least part transparent or translucent, wherein the illuminatable rod or tube comprises a polymeric sheath enclosing or encapsulating a plurality of electrically connected illumination devices comprising light emitting diodes (LEDs).

23. A scooter as claimed in claim 1, wherein the void defined by the first wall is continuous.

24. A scooter as claimed in claim 1, wherein the void defined by the first wall and the further void defined by the second wall are continuous.

25. A scooter as claimed in claim 1, wherein the first and second walls define the lowermost portion of the platform.

26. A scooter as claimed in claim 1, wherein the underside of the platform includes a surface facing away from the upperside, the first wall including a portion that confronts the surface.

27. A scooter as claimed in claim 26, wherein the second wall includes a portion that confronts the surface.

28. A scooter as claimed in claim 26, wherein the space, the void, and the illuminatable means are substantially aligned with one another.

29. A scooter as recited in claim 26, wherein the illuminatable means are spaced from the underside of the platform by a first distance, the first wall extending from the underside of the platform a second distance greater than the first distance.

30. A scooter as claimed in claim 1, wherein the space and each void extend the entire longitudinal length of the platform.

31. A platform for a foot-propelled scooter having illuminatable means and a control box for the illuminatable means, the platform comprising:
a footplate having an upperside, an underside, and first and second substantially parallel longitudinal edges;
first and second generally "C"-shaped channels associated with at least a portion of each respective longitudinal edge, each of the first and second channels being adapted to receive the illuminatable means; and
first and second walls depending from the underside of the footplate away from the upperside of the footplate so as to define a space between the walls adapted to receive the control box, each of the first and second walls defining a void having a length that is substantially equal to the length of the space, wherein the first wall comprises a first portion that extends from the underside of the platform and a second portion that extends at an angle between the first portion of the first wall and the first channel and is spaced from the underside of the platform, wherein the second wall comprises a first portion that extends from the underside of the platform and a second portion that extends at an angle between the first portion of the second wall and the second channel and is spaced from the underside of the platform;
the platform being a metal platform manufactured as a unitary component.

32. A platform as claimed in claim 31, wherein the void defined by the first wall is continuous.

33. A platform as claimed in claim 32, wherein the void defined by the second wall is continuous.

34. A platform as claimed in claim 31, wherein the first and second walls define the lowermost portion of the platform.

35. A platform as claimed in claim 31, wherein the underside of the platform includes a surface facing away from the upperside, the first wall including a portion that confronts the surface.

36. A platform as claimed in claim 35, wherein the second wall includes a portion that confronts the surface.

37. A platform as claimed in claim 31, wherein the space, the voids, and the "C"-shaped channels are substantially aligned with one another.

38. A platform as recited in claim 31, wherein the "C"-shaped channels are spaced from the underside of the platform by a first distance, the first wall extending from the underside of the platform a second distance greater than the first distance.

39. A platform as claimed in claim 31, wherein the space and each void extend the entire longitudinal length of the platform.

* * * * *